United States Patent [19]

Nocture et al.

[11] Patent Number: 5,510,848

[45] Date of Patent: Apr. 23, 1996

[54] SYSTEM FOR RECEIVING AND DECODING DIGITAL SIGNALS IN ACCORDANCE WITH TWO IMAGE DEFINITION LEVELS

[75] Inventors: Gilles Nocture, L'Hay-les-Roses; Thierry Fautier, Nogent-sur-Marne, both of France

[73] Assignee: U.S. Philips Corporation, New York, N.Y.

[21] Appl. No.: 269,814

[22] Filed: Jun. 30, 1994

[30] Foreign Application Priority Data

Jun. 30, 1993 [FR] France .................................. 93 08003

[51] Int. Cl.⁶ .................................................. H04N 5/46
[52] U.S. Cl. ........................................... 348/556; 348/558
[58] Field of Search .................................... 348/558, 556, 348/460, 706, 470, 554; H04N 5/46

[56] References Cited

U.S. PATENT DOCUMENTS 4,805,020  2/1989  Greenberg ................................. 348/460
5,255,097  10/1993  Spiero et al. ........................ 348/558 X
5,347,318  9/1994  Kobayashi et al. ................. 348/558 X

*Primary Examiner*—Victor R. Kostak
*Attorney, Agent, or Firm*—Laurie E. Gathman

[57] ABSTRACT

A system for receiving and decoding digital signals in accordance with two image definition levels. The system includes a transmission channel decoding sub-assembly; a source decoding sub-assembly for decoding signals of a higher definition level or signals of a lower definition level; a device for displaying the decoded signals available at the output of this sub-assembly; at a second output of the sub-assembly, a device for detecting errors during source decoding, followed, in series, by a decision circuit for controlling the switch in accordance with the output signal of said error detection device, as well as for controlling the change-over of the decoding sub-assembly from one of the two source decoding modes to the other.

10 Claims, 1 Drawing Sheet

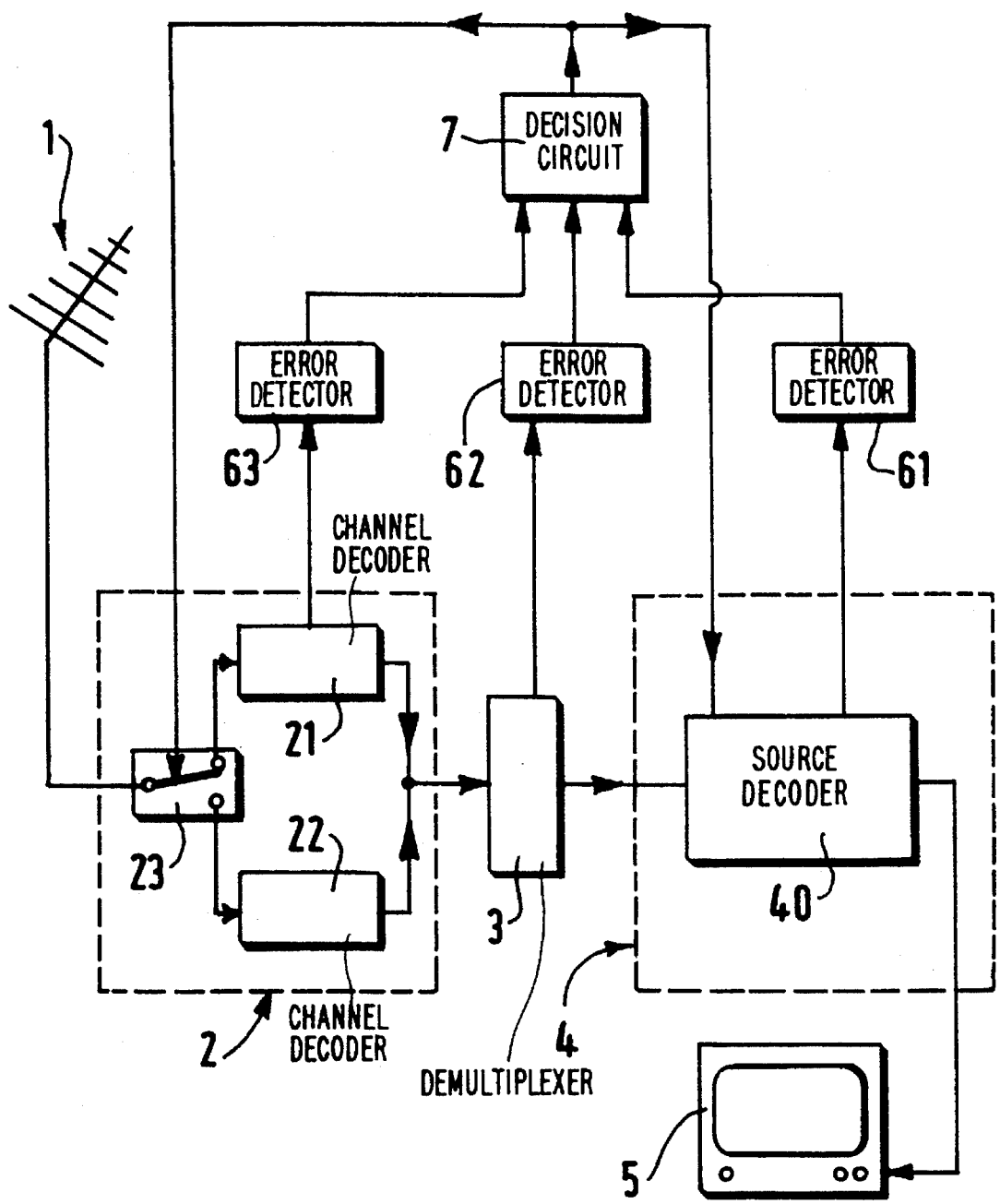

SYSTEM FOR RECEIVING AND DECODING DIGITAL SIGNALS IN ACCORDANCE WITH TWO IMAGE DEFINITION LEVELS

BACKGROUND OF THE INVENTION

The invention relates to a system for receiving and decoding digital signals in accordance with two image definition levels and including two channel decoders followed by a source decoder. This invention is applicable, for example when the same television program is broadcast in accordance with two definition levels (normal definition and high definition), and particularly when the broadcast is in conformity with the MPEG standard (whose essential characteristics will be described hereinafter).

For transmitting television signals in accordance with two definition levels, which will hereinafter be referred to as TV and HDTV transmissions, respectively, a choice is often made to ensure that TV definition signals are better protected against transmission errors than HDTV definition signals. This characteristic feature is particularly important in that it provides an easier reception of TV signals by means of a smaller antenna, a less expensive receiver, etc. However, in certain conditions such as a distant position of the transmitter or various perturbations of the transmission in general, the HDTV signals may not be fully usable for decoding or may even be completely unusable because they are less well protected than the TV signals.

SUMMARY OF THE INVENTION

It is an object of the invention to provide a decoding and receiving system which remedies this situation.

To this end the system according to the invention is characterized in that it comprises a series arrangement of:

(A) a sub-assembly for decoding the received signals in accordance with two distinct modes, comprising a first channel decoder for the signals of the higher definition level and, in parallel therewith, a second channel decoder for the signals of the lower definition level, these decoders being preceded or followed by a switch for selecting one of these decoders;

(B) a source decoding sub-assembly for decoding the signals of the higher definition level or the signals of the lower definition level;

(C) a device for displaying the decoded output signals of said source decoding sub-assembly; and in that it also comprises:

(D) at a second output of the source decoding sub-assembly, a first device for detecting errors during the source decoding, followed, in series, by a decision circuit for controlling the switch in accordance with the output signal of said error detection device, as well as for controlling the change-over of the decoding sub-assembly from one of the two decoding modes to the other.

The proposed structure which can be given a different configuration ensures that the viewers will get the best possible service by realising a high-definition decoding when the conditions allow this and by adopting a different configuration for changing over to a low-definition decoding when the transmission perturbations no longer allow a correct high-definition decoding.

These and other aspects of the invention will be apparent from and elucidated with reference to the embodiment described hereinafter.

BRIEF DESCRIPTION OF THE INVENTION

FIG. 1 shows an embodiment of the receiving and decoding system according to the invention.

DETAILED DESCRIPTION OF PREFERRED EMBODIMENTS OF THE INVENTION

Before describing this embodiment of the system according to the invention, it will be useful to give a brief description of the characteristics of the MPEG standard. This standard, which was recently elaborated by the group referred to as "Moving Picture Expert Group" (MPEG) established by the international standardization organization (I.S.O) and the Commission Electrotechnique Internationale (CEI) in 1988 with the objective of establishing an international standard for coding, storing and reconstituting animated digital video images, defines a very efficient coding process for recording non-interlaced images which may have any format, particularly the CIF format (Common Intermediate Format, 288 lines×352 pixels/line, 25 Hz, 1:1). The coding methods which are compatible with this standard provide the possibility of, for example compressing a digital television signal of 160 Mbits/s to 5 Mbits/s, i.e. in a ratio of 32/1 while preserving a very satisfactory picture quality.

Such a standard has the following characteristics. A sequence of animated images comprises information relating to the luminance component Y and information relating to the chrominance components or colour difference signals U and V. The input format is such that the chrominance is sub-sampled by four with respect to the luminance. Consequently, there are two values related to the colour (one for U, the other for V) for four luminance values. As the grey levels for the luminance Y and the colour levels for the signals U and V are expressed by digital words of 8 bits arranged in matrices and as these matrices of words are divided into blocks of 8×8 pixels, four adjacent blocks of the matrix Y correspond to one block of the matrix U and to one block of the matrix V, and these six blocks jointly constitute a macroblock (MB). These blocks and macroblocks are the image subdivision units which are subjected to coding or other operations. The rearrangement of a series of macroblocks constitutes a slice and each picture is composed of a given number of slices, for example 36 in the embodiment described. The rearrangement of various pictures constitutes a group of pictures, or GOP, which comprises an arbitrary number of pictures, and the sequence of pictures finally corresponds to the highest level, which sequence starts with a header comprising the information components required for decoding the sequence (starting code of the sequence, format, picture rate, bit rate, memory size, quantization matrices) includes a GOP sequence and ends with a code indicating the end of the sequence.

The system according to the invention, which is compatible with the MPEG standard whose essential characteristics have been described hereinbefore, comprises the following elements which are described with reference to FIG. 1 showing the basic system in accordance with the invention and several supplementary elements with which modifications of this basic system can be defined. A channel decoding sub-assembly 2 is arranged at the output of an antenna 1 for receiving the transmitted signals (TV and HDTV signals) and subsequently a demultiplexing device 3 is arranged in series with this sub-assembly (this demultiplexing device may not be present, and the diagrams of the system in its presence and in its absence constitute two distinct modes as indicated hereinbefore), a source decoding sub-assembly 4 and a display device 5. A second output of the sub-assembly 4 is connected to a device 61 for detecting errors during source decoding, whose output is connected to a decision circuit 7 which in its turn is connected via its output to the channel decoding and source decoding sub-assemblies 2 and 4, respectively.

The operation of this system will now be described by way of a particular embodiment in which the source decoding operation is performed in conformity with the MPEG standard. In this case, any transmission perturbations introduce errors in the binary data stream, by which errors this stream is not in conformity with the MPEG standard and, at the moment of decoding, lead to aberrations or contradictions: for example, after orthogonal transform of a block of 8×8 pixels, more than 64 coefficients are obtained, or the data stream seems to correspond to more macroblocks per slice of the picture than was given initially, etc. In such situations there will generally be a completely false decoding so that it is not possible to resynchronize on non-perturbed data at the start of the next slice when using a data stream of the MPEG type.

The error detection device 61 is intended for evaluating the significance of the resultant perturbations or aberrations. This device 61 evaluates a given parameter such as the number of perturbed picture slices in a sequence of N successive pictures. The decision circuit 7 then decides, for example whether there is no longer any normal operation, but a perturbed operation when it is found that, on average, more than one section of the picture slice in a sequence of fifty successive HDTV pictures is perturbed and thus incorrectly decoded. When such a threshold is exceeded, the decision circuit transmits a control signal which is received by the channel decoding and source decoding sub-assemblies 2 and 4.

It is known that the transmission of digital television signals implies very high bit rates which cannot be ensured at reasonable cost. Different techniques for reducing these bit rates are usable. However, by reducing the redundancy of information components, each of these will now be essential. The possible transmission errors, which could be easy enough to correct if the information components to be transmitted were redundant, have much graver consequences when this redundancy is reduced considerably, because the extent of faults due to transmission errors unfortunately increases more rapidly than the bit rate reduction factor. For protection against these transmission errors or for reducing these effects, one of the techniques employed is to associate the bit rate reduction device (or source coder) with an error correction device, or channel coder, with which the information components which are most sensitive to these transmission errors can be protected in a selective manner.

Upon reception or reading of the information components stored after transmission and/or storage, the inverse operation is to be ensured, viz. decoding of the channel. To this end the sub-assembly 2 comprises a channel decoder 21 for the HDTV signals in the embodiment described. In parallel with this decoder, the sub-assembly 2 also comprises a channel decoder 22 for the TV signals, preceded by a switch 23 for selecting one of these decoders. This switch is controlled by the output signal of the decision circuit 7 when, in response to the detection by the device 61, this decision circuit indicates that the operation is no longer normal but perturbed and that there is no longer any satisfactory reception of the HDTV signals.

The demultiplexing device (if present at the output of sub-assembly 2) then no longer receives the output signals from the HDTV signal decoder 21 but those of the TV signal decoder 22 and applies them to the source decoding sub-assembly 4. In this case, this sub-assembly 4 comprises a source decoder 40 (which is, for example a variable-length decoding sub-assembly) arranged to decode either the HDTV signals or the TV signals. This decoder 40 changes from the HDTV decoding mode to the TV decoding mode upon the indication of a signal supplied by the decision circuit 7. The display device 5 receives the decoded signals which are either HDTV signals or TV signals. In poor transmission conditions at least the binary TV signal sequence is decoded, which is preferable to receiving nothing at all, and the TV images can either be displayed as such or in the larger HDTV format at the end of decoding each image or in the course of decoding the binary sequence.

The invention is not limited to the embodiment described above and shown in the FIGURE. With the basic system comprising the elements 1, 2, 4, 5, 61 and 7, modifications may be proposed without departing from the scope of the invention. It has been explained hereinbefore that the demultiplexing device 3 may not be present. Its presence is not necessary when the data received correspond to a single HDTV sequence only, but it will be necessary when at least two digital HDTV sequences are transmitted (and possibly, at the same time, associated audio signals). The demultiplexing device 3 provides the possibility of separating the data associated with each of these sequences (i.e. the respective digital signal sequences).

When this demultiplexing device 3 is provided, it generally uses particular code words for performing its function. If these digital words are too much deteriorated due to a poor transmission quality, there will also be a poor demultiplexing operation. It is then useful to provide a second output of the device 3 with a second device 62 for detecting errors during the demultiplexing operation. Like the first device 61, this device 62, whose output is also connected to another input of the decision circuit 7, is intended to evaluate the significance of perturbations or aberrations of the relevant digital signals, and has a structure which is identical to that of the device 61.

It may also be useful (although undoubtedly redundant to some extent because errors produced at the channel decoding or demultiplexing level propagate most frequently at the source decoding level) to provide a second output of the channel decoding sub-assembly 2 with a third device 63 for detecting errors during the channel decoding operation, which device has a structure and operation similar to those of the first and second devices 61 and 62. Similarly as in these devices, the output of the third device 63 is connected to a corresponding input of the decision circuit 7.

When the system automatically has its position in the configuration which corresponds to decoding and displaying TV signals, a new HDTV decoding attempt may subsequently be made, either manually or automatically after a predetermined or adjustable time interval or at regular time intervals fixed, for example by the decision circuit 7 then having inverse control means for this purpose, such as a time delay so as to revert the system to the HDTV decoding mode by operating the switch 23. It should also be noted that this switch 23 preceding the channel decoders in the embodiment described may alternatively be arranged behind these decoders.

We claim:

1. A system for receiving and decoding digital signals having two image definition levels, a higher image definition level and a lower image definition level, the system comprising:

a) a sub-assembly for receiving the digital signals and including i) a first channel decoder for decoding signals of the higher definition level ii) a second channel decoder for decoding signals of the lower definition level, said first and second channel decoders being coupled in parallel and iii) a switch coupled to the first and second channel decoders for selecting one of said channel decoders;

b) a source decoding sub-assembly for decoding the signals from the selected channel decoder and being arranged to decode both the higher and the lower definition levels;

c) an error detector coupled to the source decoding sub-assembly for detecting perturbations in the received digital signals and for providing an output signal which indicates the level of perturbations in the received signals; and d) a decision circuit coupled to the error detector for controlling the switch in accordance with the output signal and for controlling the source decoding sub-assembly to decode the higher definition level if the first channel decoder is selected and the lower definition level if the second channel decoder is selected.

2. A system as claimed in claim 1, further including a demultiplexer coupled between said sub-assembly for decoding and said source decoding sub-assembly, said demultiplexer for demultiplexing a plurality of signal sequences having a similar definition level.

3. A system as claimed in claim 2, further including a second error detector coupled to the demultiplexer and the decision circuit for detecting errors during demultiplexing.

4. A system as claimed in claim 3, further including a third error detector, coupled to the sub-assembly for decoding and to the decision circuit for detecting errors in the decoding performed by the sub-assembly for decoding.

5. A system as claimed in claim 1, further including an inverse control device for inverse control of the switch by returning the switch to its previous state.

6. A system as claimed in claim 1, further including a device for displaying the decoded signals of said source decoding sub-assembly.

7. A system for receiving and decoding digital signals having two image definition levels, a higher image definition level and a lower image definition level, the system comprising:

a) a sub-assembly for receiving the digital signals and including i) a first channel decoder for decoding signals of the higher definition level, ii) a second channel decoder for decoding signals of the lower definition level, said first and second channel decoders being coupled in parallel, and iii) a switch coupled to the first and second channel decoders for selecting one of said channel decoders;

b) a source decoding sub-assembly for decoding the signals from the selected channel decoder and being arranged to decode both the higher and the lower definition levels;

c) an error detector coupled to the source decoding sub-assembly for detecting perturbations in the received digital signals and for providing an output signal which indicates the level of perturbations in the received signals; and d) a decision circuit coupled to the error detector for controlling the switch in accordance with the output signal such that if the output signal indicates a high perturbation level the switch selects the second channel decoder.

8. A system as claimed in claim 7, further including a device for displaying the decoded signals of said source decoding sub-assembly.

9. A system as claimed in claim 7, wherein the error detector measures the number of perturbed pictures in a sequence N of successive pictures to determine the perturbation level.

10. A system as claimed in claim 7, wherein the source decoding sub-assembly includes two modes of operation a high definition signal decoding mode and a low definition signal decoding mode and wherein the decision circuit outputs a signal to the source decoding sub-assembly indicating which mode should be selected by the source decoding sub-assembly in dependence on the perturbation level.

* * * * *